US009886303B2

(12) United States Patent
Koller Jemio et al.

(10) Patent No.: US 9,886,303 B2
(45) Date of Patent: Feb. 6, 2018

(54) SPECIALIZED MICRO-HYPERVISORS FOR UNIKERNELS

(71) Applicant: International Business Machines Corporation, Armonk, NY (US)

(72) Inventors: Ricardo A. Koller Jemio, White Plains, NY (US); Daniel J. Williams, Ithaca, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/182,966

(22) Filed: Jun. 15, 2016

(65) Prior Publication Data

US 2017/0364377 A1 Dec. 21, 2017

(51) Int. Cl.
*G06F 9/455* (2006.01)
*G06F 9/22* (2006.01)
(Continued)

(52) U.S. Cl.
CPC ............ *G06F 9/45558* (2013.01); *G06F 8/41* (2013.01); *G06F 8/54* (2013.01); *G06F 9/223* (2013.01);
(Continued)

(58) Field of Classification Search
CPC .. G06F 9/45558; G06F 9/45516; G06F 9/223; G06F 2009/45595; G06F 2009/45591; G06F 8/41; G06F 8/54
See application file for complete search history.

(56) References Cited

U.S. PATENT DOCUMENTS 8,370,473 B2 2/2013 Glikson et al.
9,146,965 B2 9/2015 Yashiro et al.
(Continued)

OTHER PUBLICATIONS

Dan Williams and Ricardo Koller. 2016. Unikernel monitors: extending minimalism outside of the box. In 8th USENIX Workshop on Hot Topics in Cloud Computing (HotCloud 16).*
(Continued)

*Primary Examiner* — Benjamin Wu
(74) *Attorney, Agent, or Firm* — Keivan E. Razavi; Otterstedt, Ellenbogen & Kammer, LLP

(57) ABSTRACT

Application code is obtained at a compiler toolchain, which accesses a package manager that tracks dependencies for a set of software components including application-level components represented as application-level packages, hypervisor interface-level components represented as hypervisor interface-level packages, and hypervisor-level components represented as hypervisor-level packages. A dependency solver is employed to select a sub-set of the set of packages that satisfy the dependencies. The sub-set of packages is assembled into an executable bundle, including a statically-linked binary built entirely from the sub-set of the selected packages that contains no external dependencies except calls to an interface defined entirely by the hypervisor interface-level packages, and a specialized monitor built entirely from the sub-set of the selected packages that runs on a standard operating system, loads and executes the statically-linked binary, and interacts with the statically-linked binary only through the interface defined by the hypervisor interface-level packages.

20 Claims, 11 Drawing Sheets

(51) Int. Cl.
G06F 9/45 (2006.01)
G06F 9/445 (2006.01)
(52) U.S. Cl.
CPC .............. G06F 9/45516 (2013.01); G06F 2009/45591 (2013.01); G06F 2009/45595 (2013.01)

(56) References Cited

U.S. PATENT DOCUMENTS

| | | | |
|---|---|---|---|
| 9,626,166 B1* | 4/2017 | Alewine | H04L 63/0428 |
| 2006/0130060 A1* | 6/2006 | Anderson | G06F 9/45533 718/1 |
| 2014/0245279 A1 | 8/2014 | Ohtake et al. | |
| 2015/0007197 A1 | 1/2015 | Tripp et al. | |
| 2015/0199513 A1* | 7/2015 | Ismael | G06F 21/552 726/22 |
| 2015/0199532 A1* | 7/2015 | Ismael | G06F 21/552 726/30 |
| 2016/0041923 A1* | 2/2016 | Wu | G06F 15/167 711/147 |
| 2016/0065496 A1 | 3/2016 | Bertram et al. | |
| 2016/0328173 A1* | 11/2016 | Miloser | G06F 9/455 |
| 2017/0155724 A1* | 6/2017 | Haddad | H04L 67/16 |

OTHER PUBLICATIONS

Dan Williams and Ricardo Koller. Unikernel monitors: extending minimalism outside of the box. USENIX HotCloud 2016 Jun. 20, 2016 (Presentation Slides).*
Cristian Ruiz et al, Reconstructable Software Appliances with Kameleon. ACM SIGOPS Operating Systems Review—Special Issue on Repeatability and Sharing of Experimental Artifacts archive vol. 49 Issue 1, Jan. 2015 pp. 80-89.
Yau, S. S. & An, H. G. (2011). Software Engineering Meets Services and Cloud Computing. Computer, 44(10), 47-53. doi: 10.1109/MC.2011.267, Oct. 2011.
An introduction to Clear Containers. downloaded from https://lwn.net/Articles/644675/ on Jun. 15, 2016. pp. 1-25.
AppArmor. Downloaded from http://wiki.apparmor.net/index.php/Main_Page on Jun. 15, 2016. pp. 1-4.
AWS Lambda. Downloaded from https://aws.amazon.com/lambda/ on Jun. 15, 2016. pp. 1-10.
Erlang on Xen. Downloaded from http://erlangonxen.org/case/a-zero-footprint-cloud on Jun. 15, 2016. p. 1.
IBM OpenWhisk. Downloaded from https://developer.ibm.com/open/openwhisk on Jun. 15, 2016. pp. 1-9.
The Solo5 Unikernel. Downloaded from https://github.com/djwillia/solo5 on Jun. 15, 2016. pp. 1-4.
Javascript library operating system for the cloud. Downloaded from http://runtimejs.org/ on Jun. 15, 2016. pp. 1-2.
The rumprun unikernel and toolchain for various platforms. Downloaded from http://github.com/rumpkernel/rumprun on Jun. 15, 2016. pp. 1-2.
The Venom vulnerability. Downloaded from http://cve.mitre.org/cgi-bin/cvename.cgi?name=CVE-2015-3456 on Mar. 6, 2016. pp. 1-2.
Barham, P., et al, Xen and the Art of Virtualization. In Proc. of ACM SOSP (Bolton Landing, NY, Oct. 2003). pp. 1-14.
Bellard, F Qemu, a fast and portable dynamic translator. In Proc. of USENIX Annual Technical Cont. (Freenix Track)(Anaheim, CA, Apr. 2005). pp. 41-46.
Bratterud, A., Walla, A.-A., Haugerud, H., Engelstad,P. E, and Begnum, K. IncludeOS: A minimal, resource efficient unikernel for cloud services. 2015 IEEE 7th International Conference on Cloud Computing Technology and Science, pp. 250-257, 2015.
Engler, D. R., and Kaashoek, M. F. Exterminate all operating system abstractions. Hot Topics in Operating Systems, 1995. (HotOS-V), Fifth Workshop on May 4-5, 1995. pp. 78-83.
Engler, D. R., Kaashoek, M. F., and O'Toole, J. W. Exokernel: An operating system architecture for application-level resource management. In Proc. of ACM SOSP (Copper Mountain,Co, Dec. 1995). pp. 1-16.
Garfinkel, T., Pfaff, B., Chow, J., Rosenblum, M., and Boneh, D. Terra: A virtual machine-based platform for trusted computing. In ACM SIGOPS Operating Systems Review (2003), vol. 37, ACM, pp. 193-206.
Kivity, A., Laor, D., Costa, G., Enberg, P., Harel, N.,Marti, D., and Zolotarov, V. OSv—Optimizing the operating system for virtual machines. In 2014 usenix annual technical conference (usenix atc 14) (2014), pp. 61-72 Plus Cover.
Klein, G., Elphinstone, K., Heiser, G., Andronick, J., Cock, D., Derrin, P., Elkaduwe, D., Engelhardt, K., Kolanski, R., Norrish, M., Sewell, T., Tuch, H., and Winwood, S. seL4: Formal verification of an OS kernel. In Proc. Of ACM SOSP (Big Sky, MT, Oct. 2009). pp. 1-18.
Krasnyansky, M. Universal TUN/TAP device driver, 1999. Downloaded from https://www.kernel.org/pub/linux/kernel/people/marcelo/lin ux2.4/Documentation/networking/tuntap.txt on Jun. 15, 16. pp. 1-3.
Krieger, O., Auslander, M., Rosenburg, B., Wisniewski, R. W., Xenidis, J., Da Silva, D., Ostrowski, M., Appavoo, J., Butrico, M., Mergen, M., et al. K42: building a complete operating system. In ACM SIGOPS Operating Systems Review (2006), vol. 40, ACM, pp. 133-145.
Madhavapeddy, A., Leonard, T., Skjegstad, M., Gazagnaire, T., Sheets, D., Scott, D., Mortier, R., Chaudhry, A., Singh, B., Ludlam, J., Crowcroft, J., and Leslie, I. Jitsu: Just-in-time summoning of unikernels. In Proc. of Usenix NSDI (Oakland, CA, May 2015). pp. 559-573 Plus Cover.
Madhavapeddy, A., Mortier, R., Rotsos, C., Scott, D., Singh, B., Gazagnaire, T., Smith, S., Hand, S., and Crowcroft, J. Unikernels: Library operating systems for the cloud. In Proc. of ACM ASPLOS (Houston, TX, Mar. 2013). pp. 1-12.
Martins, J., Ahmed, M., Raiciu, C., Olteanu, V.,Honda, M., Bifulco, R., and Huici, F. ClickOS and the art of network function virtualization. In Proc. of USENIX NSDI (Seattle, WA, Apr. 2014). pp. 459-473 Plus Cover.
Porter, D. E., Boyd-Wickizer, S., Howell, J., Olinsky, R., and Hunt, G. C. Rethinking the library os from be top down. ACM SIGPLAN Notices 46,3 (2011), 291-304.
Price, D., and Tucker, A. Solaris Zones: Operating system support for consolidating commercial workloads. In Proc. of USENIX Lisa (Atlanta, Ga, Nov. 2004). pp. 241-254.
Russell, R. virtio: Towards a de-facto standard for virtual I/O devices. SIGOPS OSR 42,5 (2008), 95-103.
Schatzberg, D., Cadden, J, Krieger, O., and Appavoo, J. A way forward: Enabling operating system innovation in the cloud. In Proc. of USENIX HotCloud (Philadelphia, PA, Jun. 2014). pp. 1-6.
Stengel, K., Schmaus, F., and Kapitza, R. EsseOS: Haskell-based tailored services for the cloud. In Proceedings of the 12th International Workshop on Adaptive and Reflective Middleware (New York, NY, USA, 2013), ARM '13, ACM, pp. 4:1-4:6.
Suneja, S., Isci, C., De Lara, E., and Bala, V. Exploring vm introspection: Techniques and trade-offs. SIGPLAN Not. 50, 7 (Mar. 2015), 133-146.
Tsai, C.-C., Arora, K. S., Bandi, N., Jain, B., Jannen, W., John, J., Kalodner, H. A., Kulkarni, V., Oliveira, D., and Porter, D. E. Cooperation and security isolation of library oses for multi-process applications. In Proceedings of the Ninth European Conference on Computer Systems (2014), ACM, p. 1-14.

* cited by examiner

```
/* UKVM_PORT_NETWRITE */
struct ukvm_netwrite {
    void *data;    /* IN */
    int len;       /* IN */
    int ret;       /* OUT */
};
```

*FIG. 9*

| | | QEMU | ukvm |
|---|---|---|---|
| Solo5 Kernel | malloc | 6282 | 6282 |
| | runtime | 2689 | 2272 |
| | virtio | 727 | - |
| | loader | 886 | - |
| | *total* | *10484* | *8552* |
| Monitor | QEMU | 25003 | - |
| | ukvm | - | 990 (+ 172 tap) |
| | *total* | *25003* | *1162* |

*FIG. 11*

000
SPECIALIZED MICRO-HYPERVISORS FOR UNIKERNELS

BACKGROUND

The present invention relates to the electrical, electronic and computer arts, and, more particularly, to cloud computing infrastructure, and the like.

Even though the cloud has long been thought of as a way to obtain on-demand computing resources, the very definition of on-demand seems to be challenged by new applications. Whereas by-the-hour time granularity once was considered fine-grained, for new computing domains, such as Internet of Things or Network Function Virtualization (NFV), it is desirable to command resources as a much finer granularity to react to an event from one of potentially thousands of sources.

Recently, unikernels have emerged as an exploration of minimalist software stacks to improve the security, performance, and management (especially related to "immutable infrastructure" concepts) of applications in the cloud. Unikernels are specialized, single address space machine images constructed by using library operating systems. A developer selects, from a modular stack, the minimal set of libraries which correspond to the operating system (OS) constructs required for his or her application to run. These libraries are then compiled with the application and configuration code to build fixed-purpose images (unikernels) which run directly on a hypervisor or hardware without an intervening OS such as Linux or Windows.

SUMMARY

Principles of the invention provide techniques for specialized micro-hypervisors for unikernels and the like. In one aspect, an exemplary method includes obtaining, at a compiler toolchain, application code for an application to be implemented; and accessing, with the compiler toolchain, a package manager which tracks dependencies for a set of software components represented as a corresponding set of packages. The set of software components include application-level components represented as application-level packages, hypervisor interface-level components represented as hypervisor interface-level packages, and hypervisor-level components represented as hypervisor-level packages. The dependencies are specified as metadata of the set of packages. Further steps include employing a dependency solver of the package manager to select a sub-set of the set of packages that satisfy corresponding ones of the dependencies based on references to given ones of the packages in the application and corresponding metadata in each of the given ones of the packages; and, with the compiler toolchain, assembling the sub-set of packages into an executable bundle to implement the application. The executable bundle includes a statically-linked binary built entirely from the sub-set of the selected packages that contains no external dependencies except calls to an interface defined entirely by the hypervisor interface-level packages, and a specialized monitor built entirely from the sub-set of the selected packages that runs on a standard operating system, loads and executes the statically-linked binary, and interacts with the statically-linked binary only through the interface defined by the hypervisor interface-level packages.

In another aspect, an exemplary system includes a compiler toolchain which obtains application code for an application to be implemented; and a software component library storing a set of software components represented as a corresponding set of packages. The set of software components includes application-level components represented as application-level packages, hypervisor interface-level components represented as hypervisor interface-level packages, and hypervisor-level components represented as hypervisor-level packages. The dependencies are specified as metadata of the set of packages. Also included is a package manager in communication with the compiler toolchain and the software component library. The package manager in turn includes a dependency solver. The package manager tracks dependencies for the set of software components represented as the set of packages. The package manager is accessed by the compiler toolchain. The dependency solver of the package manager selects a sub-set of the set of packages that satisfy corresponding ones of the dependencies based on references to given ones of the packages in the application and corresponding metadata in each of the given ones of the packages. The compiler toolchain assembles the sub-set of packages into an executable bundle to implement the application. The executable bundle includes a statically-linked binary built entirely from the sub-set of the selected packages that contains no external dependencies except calls to an interface defined entirely by the hypervisor interface-level packages, and a specialized monitor built entirely from the sub-set of the selected packages that runs on a standard operating system, loads and executes the statically-linked binary, and interacts with the statically-linked binary only through the interface defined by the hypervisor interface-level packages.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example, one or more embodiments provide any one, some, or all of the following benefits:

Improved isolation;
Improved security;
Improved performance and/or management;
High-speed paravirtualization (PV) interfaces (paravirtualization means that the virtual machine runs on a virtual hardware abstraction that is (usually only slightly) different from the machine's physical hardware abstraction. PV interfaces can be more efficient (high-speed) and/or less complex than their physical interface counterparts); and/or Boot time acceleration.

These and other features and advantages of the present invention will become apparent from the following detailed description of illustrative embodiments thereof, which is to be read in connection with the accompanying drawings.

BRIEF DESCRIPTION OF THE DRAWINGS

FIG. 9 depicts an example interface to send a network packet, in accordance with an aspect of the invention;

FIG. 11 is a table depicting lines of code for the kernel and the monitor for a general-purpose QEMU and a specialized ukvm, in accordance with an aspect of the invention.

DETAILED DESCRIPTION

Figure 1:
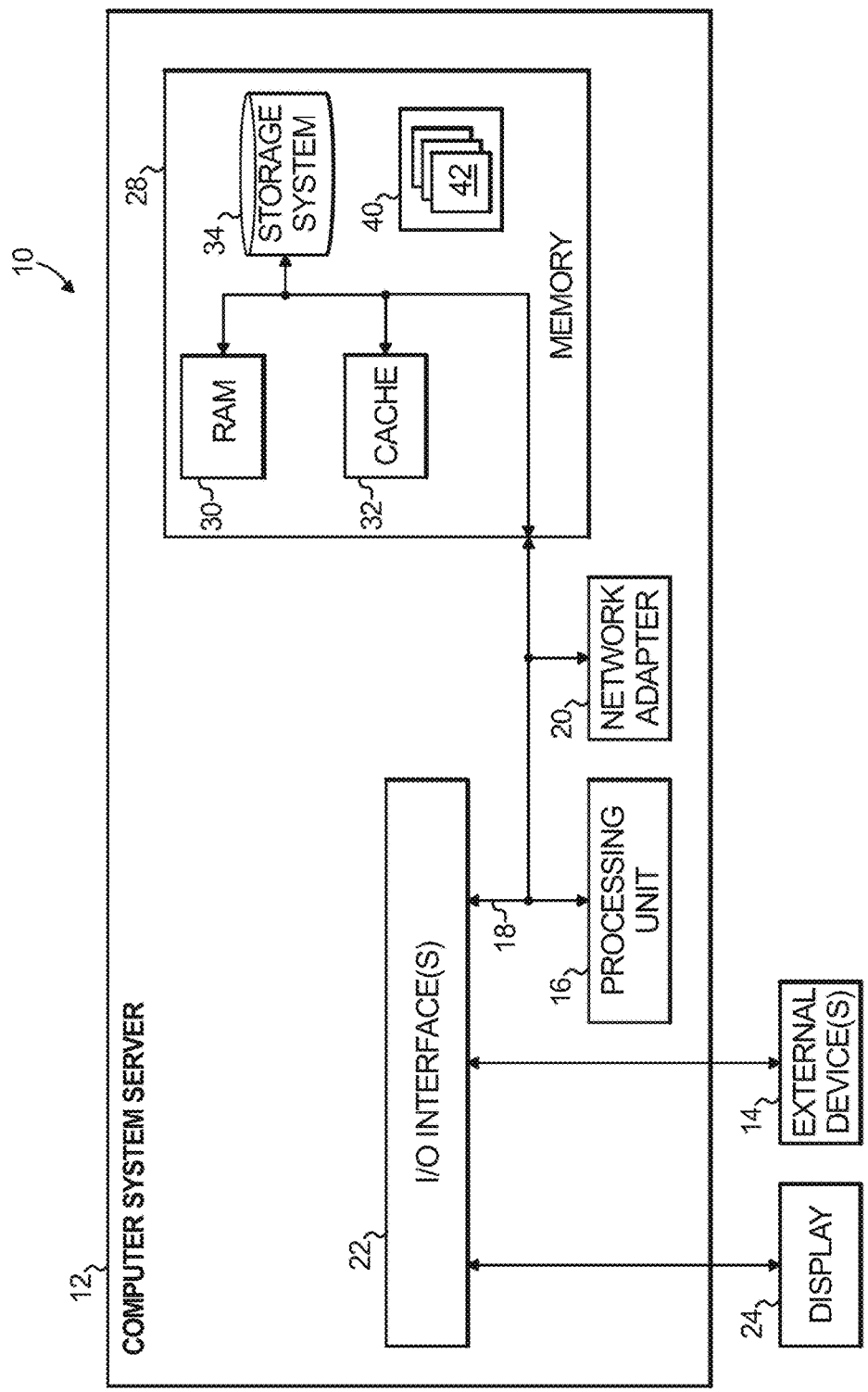
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
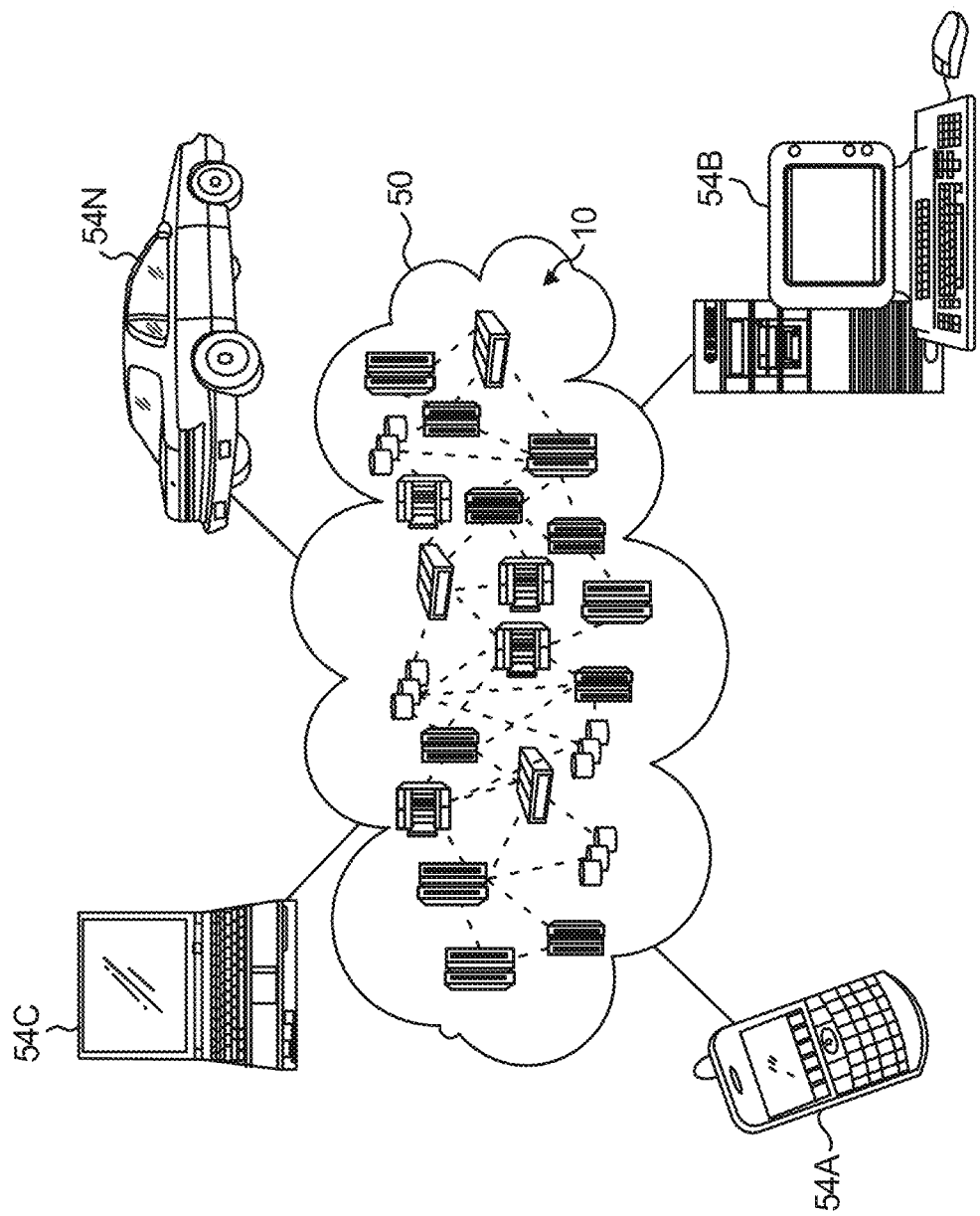
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
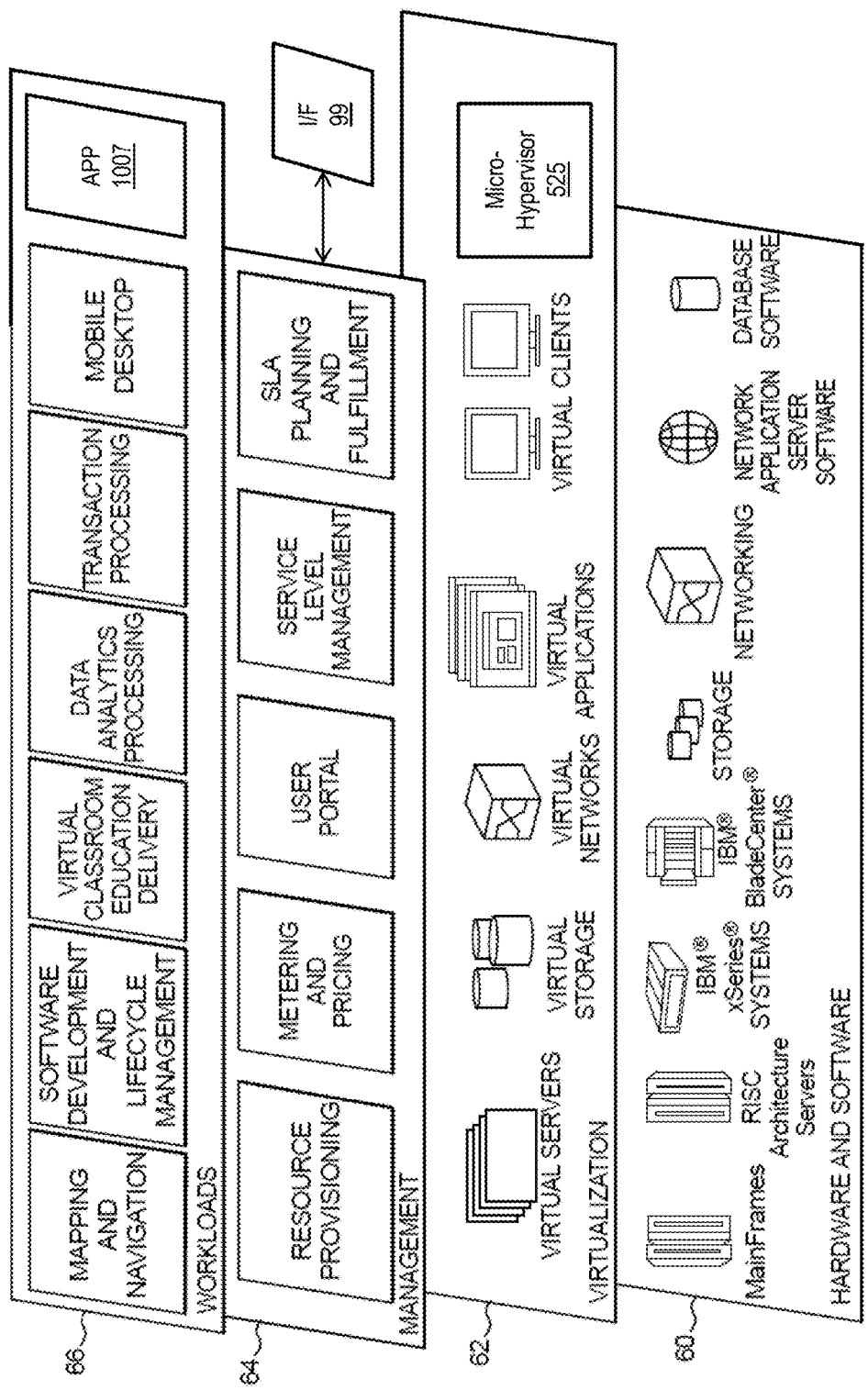
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, even though the cloud has long been thought of as a way to obtain on-demand computing resources, the very definition of on-demand seems to be challenged by new applications. Whereas by-the-hour time granularity once was considered fine-grained, for new computing domains, such as Internet of Things or Network Function Virtualization (NFV), it is desirable to command resources as a much finer granularity to react to an event from one of potentially thousands of sources.

As the speed at which application demands for cloud resources have decreased, the cloud architecture has evolved towards lighter-weight, more agile vehicles to run code on the cloud. Full-system virtualization (e.g., the virtual machine (VM) abstraction) has been challenged by operating-system level virtualization (e.g., the Linux container abstraction), and more recently the idea of specialized unikernels, each vehicle being smaller and lighter than the last.

The latest iteration, unikernels, are essentially a revitalization of library operating systems (e.g., Exokernel) in a cloud setting. Each unikernel is a specialized, tiny VM that contains only a single application linked to only the parts of an OS-like library that it needs. Unikernels promise a range of benefits, encompassing performance, security (i.e., reduced attack surface within), and the natural embodiment of new "devops" methodologies (e.g., immutable infrastructure). Often, unikernels are written in a high-level language throughout that serves to further strengthen security arguments.

Unikernels have been demonstrated to boot in as low as ~20 ms, which, in addition to their isolation and security properties, make them interesting for new cloud domains. For example, in the context of both network function virtualization (NFV) and Internet of Things (IoT), ongoing research is exploring the use of unikernels in an on-demand (or "just-in-time") manner.

However, to achieve such a fast boot, it appears necessary to modify the existing hypervisor toolstack. For example, both ClickOS and Jitsu, which run on the Xen hypervisor, have performed extensive modifications to Xen's toolstack. It is unclear whether existing cloud providers will be willing to maintain custom toolstacks for unikernels alongside their existing tooling for VMs (and now containers).

One or more embodiments advantageously provide features suitable for the next iteration of containers for the cloud; namely, (1) Fast boot—on the order of ~20 ms or less; and (2) Run anywhere—the ability to run on standard Linux or a standard hypervisor toolstack. Current techniques are able to address the first of these, but not the second.

One or more embodiments make use of the insight that the functionality required by a unikernel from a hypervisor is dramatically less that that required by a legacy VM. Furthermore, such a specialized unikernel hypervisor is small and simple enough to actually be shipped with the unikernel. The specialized hypervisor, or "micro-hypervisor," replaces QEMU in a standard KVM/QEMU system. The new bundle of micro-hypervisor and unikernel can therefore run on any Linux system with the KVM module. No custom hypervisor toolstack is required by the cloud platform provider because the custom hypervisor toolstack is shipped with the unikernel.

The skilled artisan will appreciate that QEMU (short for Quick Emulator) is a free and open-source hosted hypervisor that performs hardware virtualization.

A cloud running micro-hypervisor/unikernel bundle can achieve the benefits of unikernels, including fast boot times, while remaining portable to any Linux system. Yet there are many other benefits to such an architecture that stem from the tight coupling between a specialized unikernel and a specialized micro-hypervisor. In particular, the interface between the two can be customized on a per-application basis. Further potential benefits from such control over the interface include security choke points, monitoring support, performance, and legacy support.

One or more embodiments address a set of software components in a software package ecosystem with their dependencies tracked by a package manager. Typical systems involve multiple package managers, some of which manage applications and middleware (e.g., Ruby gems), some of which manage the system (e.g., apt in Debian-based Linux systems), and some of which manage the modules that are available to the kernel (e.g., make modconfig). Now, software package ecosystems have emerged that span entire systems in the form of unikernels (e.g., MirageOS).

Heretofore, the types of packages are classified into application-level (e.g., web application), middleware-level (e.g., Web serving framework), and OS-level (e.g., TCP/IP network stack and driver) packages. All packages are tracked by a global package manager (e.g., opam for MirageOS). A developer writes some application code that references (depends on) one or more packages from the package manager. These packages may depend on others, which may depend on others, and so on. The package manager contains a dependency solver: it can compute a set of packages from which there are no external dependencies. The developer invokes a compiler toolchain on the application code. The compiler toolchain consults the package manager, which selects packages via dependency solving. Then, the compiler toolchain produces a VM image containing only those packages; specifically, it produces an executable that runs on a virtualized machine. This VM image is known as a unikernel. The unikernel can execute on a standard hypervisor (e.g., Xen).

In one or more embodiments, the package manager is extended beyond an entire virtual machine to incorporate a specialized (type-2) hypervisor and its interface with the unikernel as well. Two different types of packages are added to the package ecosystem: hypervisor packages (e.g., device backend, boot-time accelerator, etc.), and hypervisor interface packages (e.g., virtio rings, specialized hypercall interfaces). The package format for all packages in the ecosystem, including hypervisor and hypervisor interface packages, specifies dependencies between packages. Importantly, application, middleware, or OS-level packages can specify dependencies to hypervisor or hypervisor-interface level packages: there is no barrier in the package management despite a hardware protection barrier in the resultant executable. One or more embodiments modify the package manager to solve all dependencies through this augmented set of packages. One or more embodiments modify the compiler toolchain to use the modified package manager and produce not only a VM executable "unikernel", but also a "micro-hypervisor" built entirely from packages selected by the package manager and compiler toolchain. The resultant bundle is a specialized type-2 hypervisor with specialized interfaces between itself and a specialized unikernel. As a type-2 hypervisor, the bundle can execute on a standard OS (e.g., Linux).

New types of workloads are emerging in the cloud, including transient microservices, zero-footprint cloud, and the like; these developments are particularly pertinent for NFV, IoT, and Whisk. The unit of execution on the cloud is changing, as virtual machines progress to "sys" containers, then to app containers, and then to unikernels, which are small, fast, isolated, and secure. Unikernels reduce the attack surface of a "container" and run "only what is needed" in the entire "container."

Package management/dependency solving automatically selects "only what is needed." Package managers traditionally have been of limited scope; e.g., Ruby gems for middleware, apt for system packages, and Make modconfig for kernel modules. Unikernels are package managers for software throughout the entire system. MirageOS is a library operating system that constructs unikernels for secure, high-performance network applications across a variety of cloud computing and mobile platforms. OPAM is a source-based package manager for the OCaml general purpose programming language.

Figure 4:
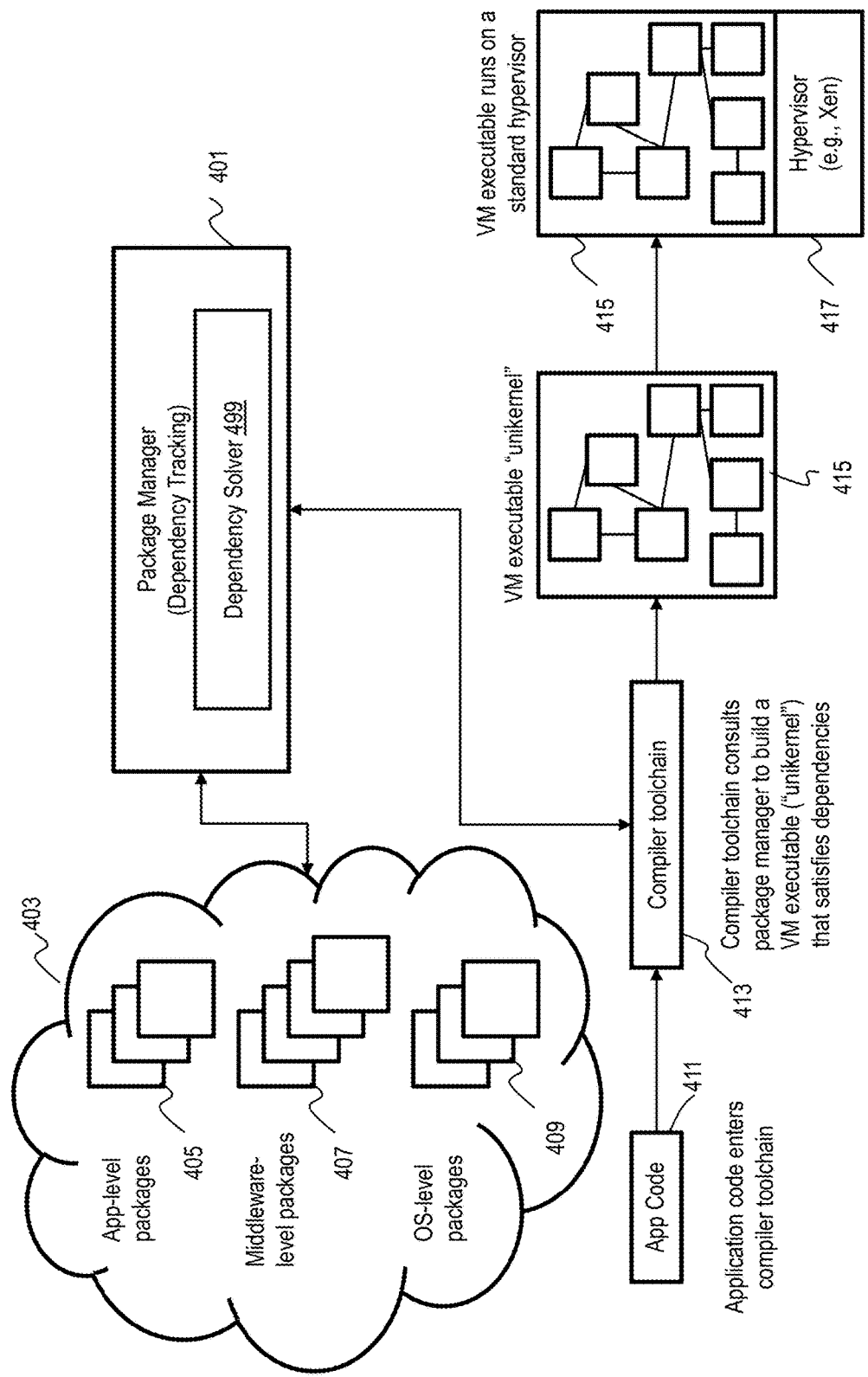
FIG. 4 depicts aspects of unikernels in accordance with the prior art.

FIG. 4 depicts unikernels (e.g., MirageOS) in accordance with the prior art. Package manager 401, among other things, tracks dependencies of packages in an available ecosystem of packages 403; including app-level packages 405, middleware-level packages 407, and OS-level packages 409. Application code 411 enters compiler toolchain 413. Compiler toolchain 413 consults package manager 401 to build a VM executable ("unikernel") 415 that satisfies dependencies. This VM executable 415 runs on a standard hypervisor 417 (e.g., Xen). The small boxes inside executable 415, not separately numbered to avoid clutter, represent the needed packages, while the lines between them represent the dependencies. For the avoidance of doubt, in FIG. 4, the cloud 403 drawn around the packages represents an "available ecosystem of packages," as opposed to a compute cloud' however, some of packages will ultimately be linked into a unikernel, which will then execute in the cloud (i.e., in a compute cloud). Package manager 401 includes dependency solver 499.

There are limitations to this prior art approach. The hypervisor interface is not minimal. For example, QEMU requires full system emulation (with concomitant VENOM vulnerability, discussed below). QEMU's VENOM vulnerability existed because the hypervisor contained a bug in its floppy drive emulation code, which was exploitable from compromised VMs regardless of the fact that no VM in the cloud actually needed a floppy drive. If the hypervisor interface was minimal, it would not have emulated the floppy drive at all for cloud VMs, and would not have had this bug. Furthermore, the hypervisor and its interface are not optimal; they rely on memory introspection, PV device interfaces, and boot time. In this regard, introspection of the contents of the VM, which is useful for management and for cloud computing providers to provide certain cloud services (e.g., ensuring all software running in the VM is up-to-date), is potentially a brittle and error prone process across a standard hypervisor interface. This is because the interface is too low level, for example, referring to disk blocks rather than files in a file system; or virtual CPUs and memory contents rather than process tables, etc. So, for introspection, the virtual hardware interface is not optimal; a higher-level interface may be better. Similarly, device interfaces may require emulated hardware constructs that slow down the I/O path (this is why paravirtualized device interfaces are used). Finally, boot time suffers from a similar problem, where hardware-like constructs are emulated; for example, the BIOS is emulated on boot time and the virtual processor is started in legacy mode and must go through all of the setup steps of a hardware processor, despite the fact that the real processor has already been bootstrapped and virtual processor setup for a cloud VM could skip those steps.

Figure 5:
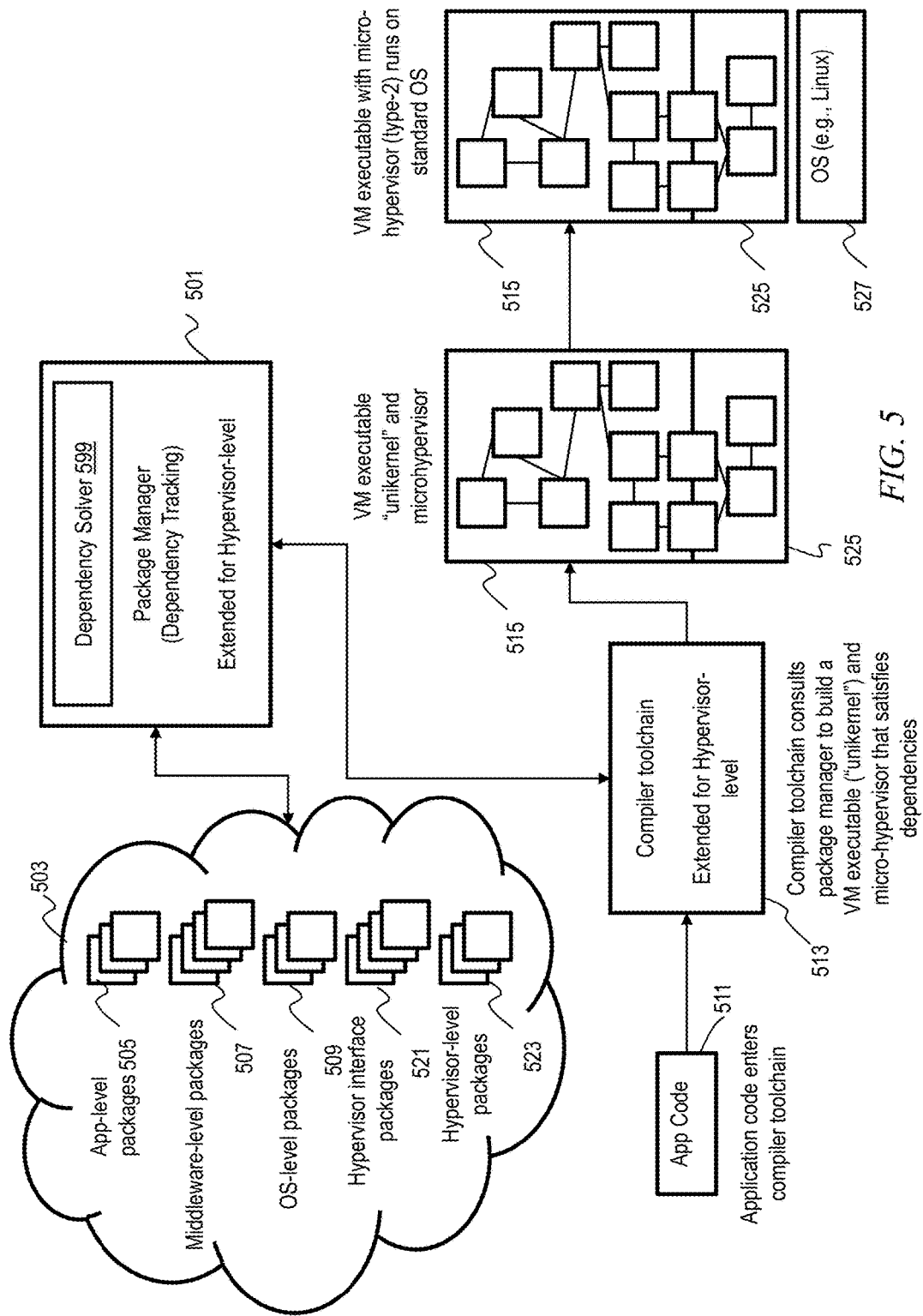
FIG. 5 is a block diagram of a system, in accordance with an aspect of the invention.

FIG. 5 depicts a block diagram of an exemplary embodiment. Package manager 501, extended for hypervisor-level, among other things, tracks dependencies of packages in available ecosystem of packages 503; including app-level packages 505, middleware-level packages 507, OS-level packages 509, hypervisor interface packages 521, and hypervisor-level packages 523. Application code 511 enters compiler toolchain 513 extended for hypervisor-level. Compiler toolchain 513 consults package manager 501 to build a VM executable ("unikernel") 515 and micro-hypervisor 525 that satisfies dependencies. The small boxes inside executable 515 and micro-hypervisor 525, not separately numbered to avoid clutter, represent the needed packages, while the lines between them represent the dependencies. This VM executable 515 with micro-hypervisor (type-2) 525 runs on a standard operating system (OS) 527 (e.g., Linux). As used herein, "type-2 hypervisor" is used in its standard way to refer to hosted hypervisors which run on a conventional operating system, as opposed to type-1 hypervisors, which are native or bare-metal hypervisors running directly on the host's hardware. Package manager 501 includes dependency solver 599.

Figure 6:
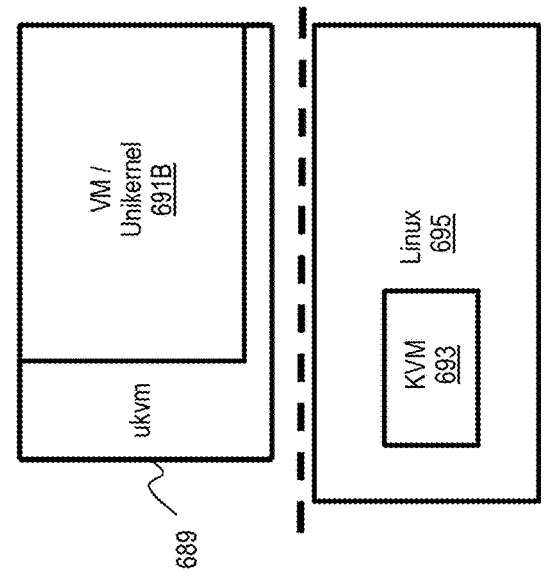
FIG. 6 compares legacy cloud stacks to a micro-hypervisor, in accordance with an aspect of the invention.
Figure 6:
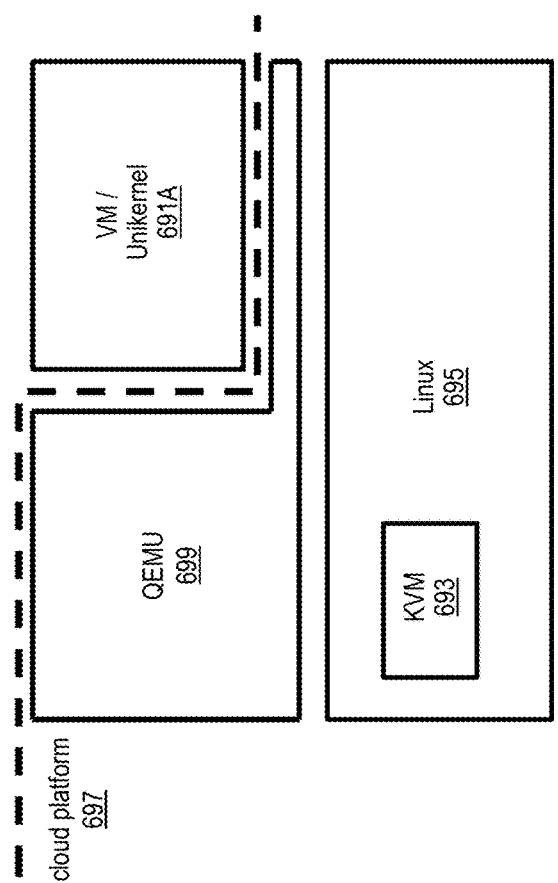

FIG. 6 compares legacy cloud stacks (left) to a micro-hypervisor (right), in accordance with an aspect of the invention. In particular, in a conventional approach at left QEMU 699 runs within cloud platform 697 on top of the Linux OS 695 with Kernel-based Virtual Machine (KVM) 693, which is a virtualization infrastructure for the Linux kernel that turns it into a hypervisor. The VM/Unikernel 691 runs on top of, and outside, the cloud platform 697. In a micro-hypervisor approach (right), the VM/Unikernel 691 runs on top of the micro-hypervisor VM (ukvm) 689 and outside of the cloud platform (signified by dotted line); the cloud platform includes the Linux OS 695 with Kernel-based Virtual Machine (KVM) 693. Note that elements 693 and 695 are the same on both sides of FIG. 6. Element 691B is largely the same as element 691A (both run the same application), however, the parts of each that interface with QEMU or ukvm are accordingly different.

Advantageously, in one or more embodiments, dependency solving improves isolation. Interface is a security choke point (off by default). Interface can be audited at compile time. Specialized interfaces allow better performance and/or management. Such interfaces can include, e.g., logging and/or monitoring interfaces high-speed PV interfaces; and the like. In one or more embodiments, specialized hypervisors allow better performance, including boot time acceleration.

One or more embodiments advantageously provide package management beyond the virtual machine, automatic specialization of the hypervisor and its interface with a VM image (unikernel), and/or bundling of the micro-hypervisor and unikernel as an execution unit.

One or more embodiments advantageously extend dependency tracking and/or solving across the hypervisor boundary. Furthermore, one or more embodiments advantageously extend the "module" concept and/or dependency solving through the hypervisor.

Accordingly, it will be appreciated that in one aspect, a method is provided to represent software components from all parts of the software stack (application, middleware, OS, hypervisor interface, hypervisor) as packages, where the package metadata specifies dependencies between packages. Furthermore, a package manager is provided, including a dependency solver that automatically selects a set of packages that satisfy dependencies based on references in the application and the metadata in each package. Even further, a compiler toolchain interacts with the package manager to obtain a list of packages and assembles them into an executable bundle. The bundle contains a specialized virtual machine image built entirely from a subset of the selected packages that contains no external dependencies except calls to an interface defined entirely by hypervisor-interface-level packages, and an executable type-2 hypervisor built entirely from a subset of the selected packages that runs on a standard OS, loads and executes the aforementioned specialized virtual machine image, and interacts with the VM only through the interfaces defined by hypervisor-interface-level packages.

Figure 7:
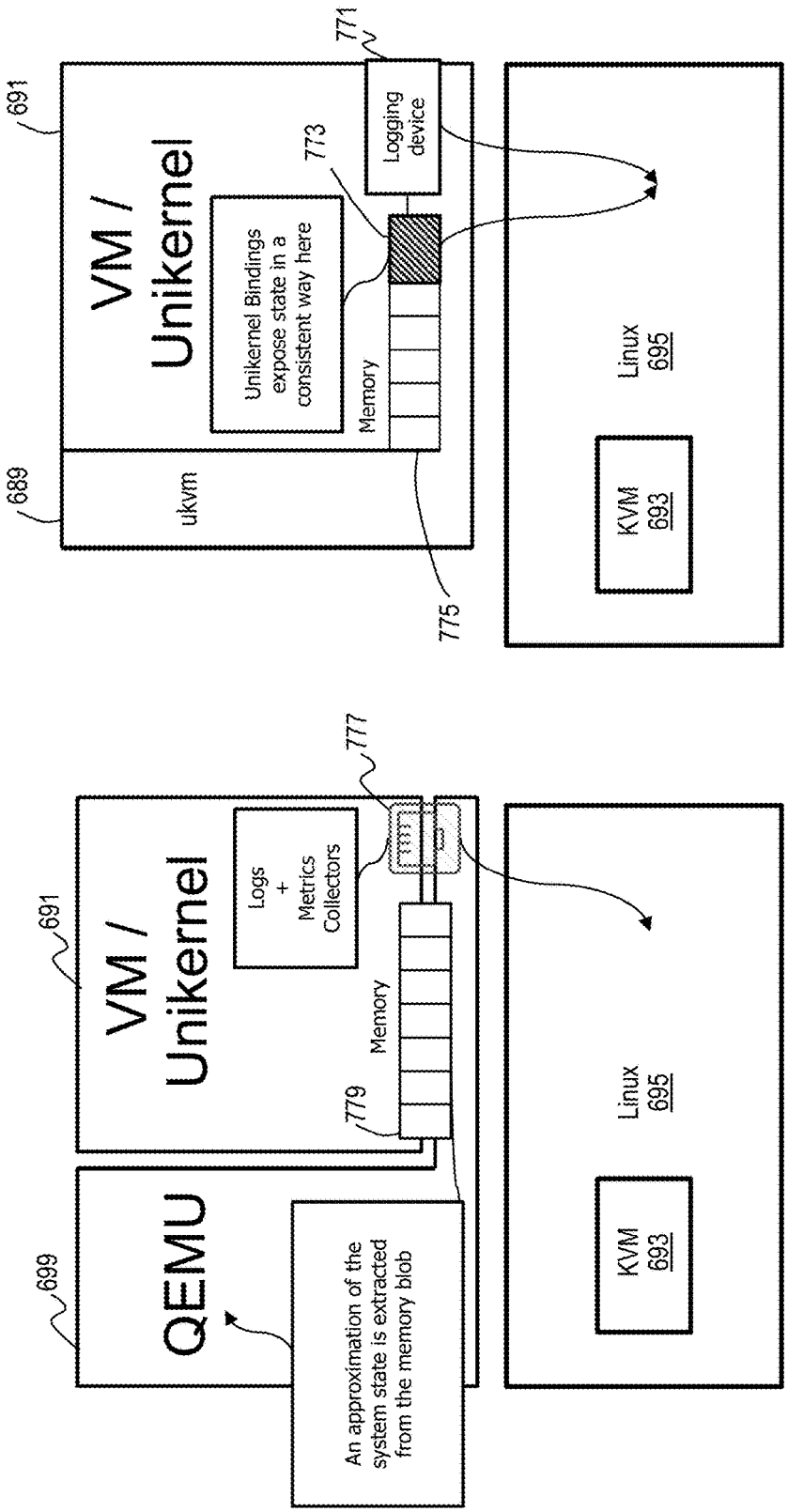
FIG. 7 depicts elements of consistent virtual machine (VM) introspection and logging, in accordance with an aspect of the invention.

FIG. 7 depicts elements of consistent virtual machine (VM) introspection and logging, in accordance with an aspect of the invention. As seen on the left-hand side, an approximation of the system state is extracted from the memory blob 779 by QEMU 699. Logs and metrics collectors 777 are provided to the Linux OS 695. On the other hand, as seen on the right-hand side, unikernel bindings expose their state in a consistent way at location 773 in memory 775; the same are provided to Linux OS 695 together with data from logging device 771.

Recently, unikernels have emerged as an exploration of minimalist software stacks to improve the security of applications in the cloud. One or more embodiments extend the notion of minimalism beyond an individual virtual machine to include the underlying monitor and the interface it exposes, via unikernel monitors. Each unikernel is bundled with a tiny, specialized monitor that only contains what the unikernel needs both in terms of interface and implementation. Unikernel monitors improve isolation through minimal interfaces, reduce complexity, and boot unikernels quickly. A non-limiting exemplary experimental implementation, referred to herein as ukvm, is less than 5% the code size of a traditional monitor, and boots MirageOS unikernels in as little as 10 ms (8×faster than a traditional monitor). These numbers are exemplary and non-limiting.

Minimal software stacks are changing thinking about assembling applications for the cloud. A minimal amount of software implies a reduced attack surface and a better understanding of the system, leading to increased security. Even better, if the minimal amount of software necessary to run an application is calculated automatically, inevitable human errors (and laziness) when trying to follow best practices can be avoided. Recently this sort of automated, application-centered, dependency-based construction of minimal systems has been explored to what some believe is its fullest extent: unikernels, which are stand-alone, minimal system images, built entirely from fine-grained modules that the application depends on, and which run directly on virtual hardware.

Nevertheless, the exploration of minimal systems for the cloud via unikernels is only complete when viewed within a box: the box in this case being a virtual machine (VM). One or more embodiments move beyond this box and ask, in terms of the dependency-based construction of minimal systems, why stop at VM images? One or more embodiments consider whether the interface between the application (unikernel) and the rest of the system, as defined by the virtual hardware abstraction, is minimal. One or more embodiments consider whether application dependencies can be tracked through the interface and even define a minimal virtual machine monitor (or in this case a unikernel monitor) for the application, thus producing a maximally isolated, minimal execution unit for the application on the cloud. One or more embodiments further address how such an approach works.

Figure 8:
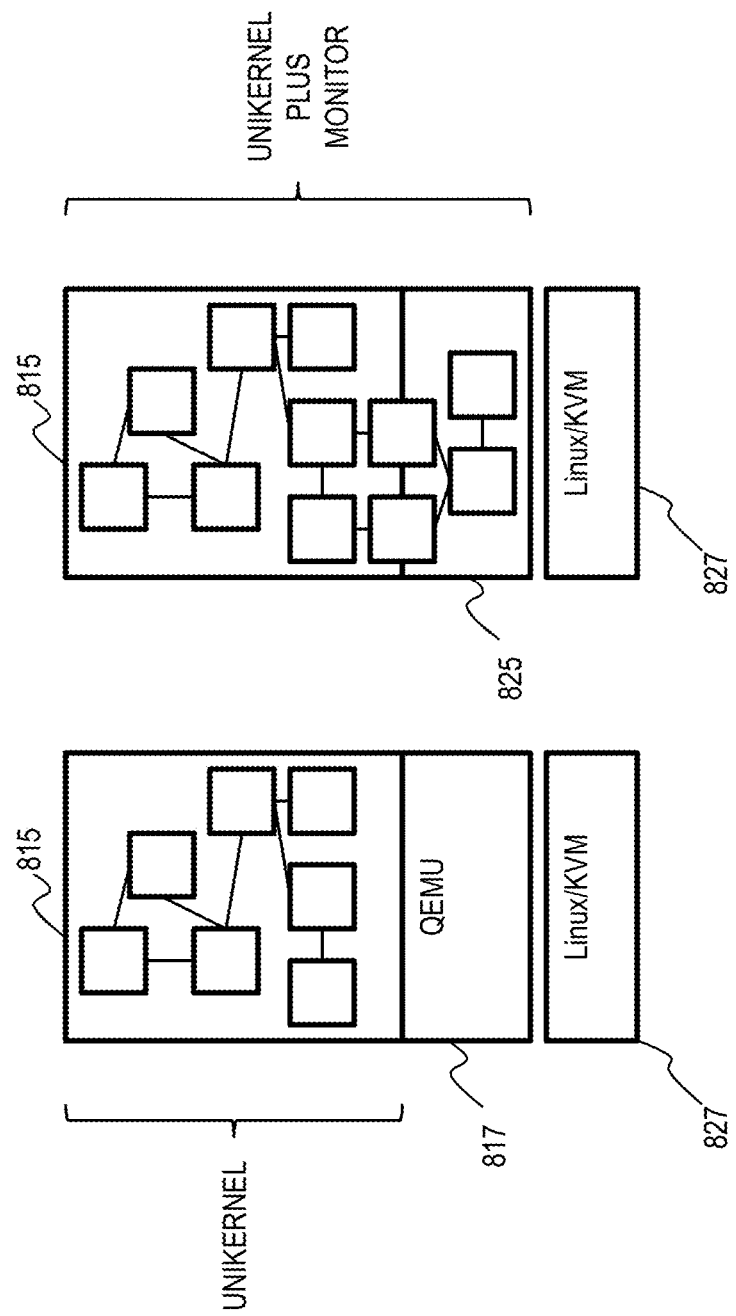
FIG. 8 depicts the unit of execution in the cloud as a unikernel, built from only what it needs, running on a VM abstraction, and a unikernel running on a specialized unikernel monitor implementing only what the unikernel needs, in accordance with an aspect of the invention.

As shown in FIG. 8, in one or more embodiments, the executables for the cloud contain both the application (e.g., a unikernel) and a monitor. In particular, in a current approach shown at the left, a unikernel 815, built from only what it needs, runs on a VM abstraction (QEMU hypervisor 817 running on top of a Linux/KVM 827. In an approach according to an exemplary embodiment, as seen on the right, a unikernel 815 runs on a specialized unikernel monitor 825 implementing only what the unikernel needs. The unikernel plus monitor runs on top of a Linux/KVM 827. The monitor is responsible both for efficiently launching the application in an isolated context and providing a specialized interface for the application to exit out of the context (e.g., for I/O), containing only what the application needs, no more, no less. The bundling of each application with its own custom monitor enables better isolation than either VMs or containers, with a simple, customized, high-performing interface. The ability of a unikernel monitor to boot unikernels quickly (as low as 10 ms) makes them well suited for future cloud needs, including transient microservices and zero-footprint operation.

The small boxes inside executable 815 and specialized unikernel monitor 825, not separately numbered to avoid clutter, represent the needed packages, while the lines between them represent the dependencies.

One or more embodiments provide techniques to permit unikernel monitors to be automatically assembled from modules; specifically, how techniques used in package management to track application dependencies can extend through interface modules as well as monitor implementations. Discussions are also provided herein regarding the dangers and difficulties of running many different monitors in the cloud and demonstrating how the small size of unikernel monitors (0.2% of a unikernel binary and 5% of the code base of traditional monitors like QEMU) admits mitigation techniques like code analysis and certification. An exemplary experimental implementation, ukvm, demonstrates the feasibility of unikernel monitors by efficiently booting MirageOS unikernels with specialized interfaces.

Specializing the Monitor

We have found that applications in the cloud should preferably sit on top of specialized interfaces and that the software layer underneath it, the monitor, should preferably not be general-purpose. The desire to eliminate general-purpose OS abstractions is not new; as such, there have been many approaches to specialize application software stacks for performance or isolation, from seminal library OS work to its more recent incarnation on the cloud under the unikernel moniker. However, specializing the underlying monitor has been less studied.

The cloud suffers from unnecessary problems because applications use general-purpose monitors and interfaces. Current clouds try to fit all applications as VMs with the x86 interface, or as containers with the POSIX interface. Despite an extremely wide range of possible interface levels to explore, we have found that any general purpose abstraction will suffer the same issues. More specifically, we have found that general purpose abstractions are not minimal, impose unnecessary complexity, and may introduce performance overheads.

Minimal Interfaces: In today's clouds, the interface to the rest of the system, whether full virtualization, paravirtualization, or OS-level (i.e., containers), is wide and general-purpose, including many unnecessary entry points into the monitor. Since each application has different requirements, a general purpose interface cannot be minimal. For example, the virtual hardware abstraction exposed by KVM/QEMU is not minimal for an application because the Virtual Machine Monitor (WM) does not know whether a guest VM (application) will require a particular virtual device or interface. Exposing virtual device interfaces when they are not necessary can be problematic for security, as demonstrated by the VENOM vulnerability in QEMU. With VENOM, a bug in virtual floppy drive emulation code could be exploited to break out of the guest, regardless of whether a virtual floppy drive is instantiated.

A specialized monitor can expose a minimal interface, determined by what the application needs, resulting in fewer vulnerabilities available to exploit. A specialized monitor exposes an off-by-default interface. Rather than trying to block interface exit points via a blacklist-style policy (e.g., Default Allow in AppArmor), exit points are explicitly introduced due to application needs, more like a whitelist. It is worth noting that the terms "unikernel monitor" and "micro-hypervisor" are used in an essentially interchangeable manner herein. For the sake of precision, it should be noted that "monitor" is more general while "micro-hypervisor" carries a connotation of virtual hardware-like interfaces. In one or more embodiments, some interfaces to the "unikernel monitor" are at a higher level of abstraction (which is where some of the advantages come from). That is to say, there is a set of interfaces, and a subset of them (i.e., some) may be operating at a higher level of abstraction than is typically expected from a VM. Furthermore in this regard, in one or more embodiments, the unikernel monitor defines the interface between the unikernel and the rest of the host system. That interface is now specialized to the unikernel because the package manager has determined what is needed by the application. There are two related aspects, namely, a breadthwise aspect (only needed components are provided) and a vertical or height-wise aspect (level of abstraction). It may be the case that a particular application uses an interface at a higher level of abstraction than would be considered normal (e.g., for a VM). One example of an interface at a higher level of abstraction would be the logging device 771 discussed elsewhere herein; another would be the use of a higher level of abstraction for sending network packets than a virtual PCI network interface card.

In some cases, it may even be possible to eliminate seemingly-fundamental interfaces, like the network. Suppose a number of microservices in the cloud are intended to be chained together to implement a larger service. In today's clouds, each microservice would utilize the network to communicate. By specializing the monitor, network interfaces can be eliminated in favor of simpler serial input and output in a familiar pattern:

echo 1|bundle1|bundle2|bundle3

Even in the case of compromise, each microservice would not have a network device available to use for communication with the outside world.

Simplicity: Regardless of the width or the level of the interface, general-purpose monitors adhere to a general purpose interface. Any implementation in the monitor (underneath the interface) must be general enough to work for the full range of applications above, thereby introducing complexity. Simplicity is somehow related to the choice of interface level: any functionality implemented underneath the interface (in the monitor) must pay a "generality tax." For example, for an interface at the TCP level, the monitor must manage multiple tenants and resource sharing in the network stack. At the packet level, the monitor must only multiplex a NIC (network interface card). In general, a lower-level interface needs to pay less "generality tax." However, even at the low layer, general-purpose monitors are still complex. Virtual hardware devices adhere to legacy standards (BIOS, PCI devices, DMA address restrictions, memory holes, etc.) so that general-purpose guests can operate them.

Specialized monitors, on the other hand, create opportunities to simplify both the guest and the monitor. Legacy standards are unnecessary for most applications in the cloud. For example, both the virtio frontend (in the guest) and back-end (in the monitor) can be completely removed in lieu of simpler, direct packet sending interfaces. Furthermore, with a specialized monitor, complex VM introspection techniques, which are brittle and suffer from inconsistencies and synchronization issues, can be replaced by introducing interfaces to facilitate introspection techniques and deal with synchronization issues. Finally, specialized interfaces to integrate with software written for general-purpose operating systems can simplify certain applications and their development.

It may be still advised to implement low-level interfaces rather than high-level interfaces in specialized monitors for security reasons (see discussion of Unikernel Monitors below), but specialized monitors do not incur a "generality tax."

Faster Boot Time: Boot time is especially important for emerging application domains including the Internet of Things (IoT), network function virtualization (NFV), and event triggered, subsecond-metered services like Amazon Lambda. In such environments, cloud-based services are expected to be created on the fly and then destroyed after they have performed their function (a/k/a zero-footprint cloud). As described above, guests running on general-purpose monitors often perform cumbersome virtual hardware negotiation and emulation, which, in addition to adding complexity, also increases boot time (e.g., to enumerate the virtual PCI bus). Efforts to improve the boot time on general-purpose monitors will eventually hit a limit where any further specialization of the monitor and guest to eliminate common discovery and negotiation may diminish the set of guests supported by the monitor. Such specialization is unacceptable for today's cloud, where there is one monitor that must support all guest workloads.

In situations where further specialization is acceptable, including the bundling of application-specific monitors with the applications themselves, better performance has been demonstrated. For example, unikernels like ClickOS and MirageOS with Jitsu have been shown to boot in as low as 20 ms on modified (specialized) VMM toolstacks.

Unikernel Monitors

In one or more embodiments, each unikernel is distributed with its own specialized monitor, and this monitor has two tasks: 1) creating an isolated context to run the unikernel, and 2) taking action whenever the unikernel exits the isolated context. The monitor thereby maintains complete control over the unikernel. One of the actions the monitor may take is to destroy the unikernel.

A straightforward implementation of a unikernel monitor is as a specialized virtual machine monitor. In this case, hardware protection provides an isolated context, using hardware support for virtualization. If the unikernel exits its context for any reason (e.g., an I/O port operation, an illegal instruction, etc.) the hardware will trap into the monitor.

The default behavior for a monitor is to maintain complete isolation for the unikernel. A completely self-contained unikernel is bundled with an extremely simple monitor. The monitor simply sets up the hardware-isolated context and runs the unikernel. It does not expose any interfaces to the unikernel: every unikernel exit results in the monitor immediately destroying the unikernel and reclaiming its resources. At this time, since the monitor is specialized for the (now destroyed) unikernel, the monitor no longer has work to do and can safely exit.

Of course, a unikernel that runs in complete isolation may not be terribly useful for the cloud. Interfaces between the unikernel and monitor are provided on a per-application basis and do not need to adhere to established standards. Interfaces can exploit the fact that the monitor is able to access the memory contents of the unikernel. For instance, FIG. 9 shows an example interface to send a network packet. By writing the address of an instance of this structure to the I/O port defined by UKVM_PORT_NETWRITE, a unikernel will exit to the monitor. The monitor directly accesses the network packet in the unikernel's memory at the specified memory location, checks or sanitizes the packet, and then sends the packet to the physical network.

Building Monitors: In theory, a unikernel strives to be a single application assembled with a minimal amount of software to allow it to run. Simply running a library operating system is insufficient for minimalism. In addition, only the functions needed by the application should be included in the library OS for any specific unikernel. Some unikernel approaches apply a clever use of package management and dependency tracking to approximate a minimal build.

Figure 10:
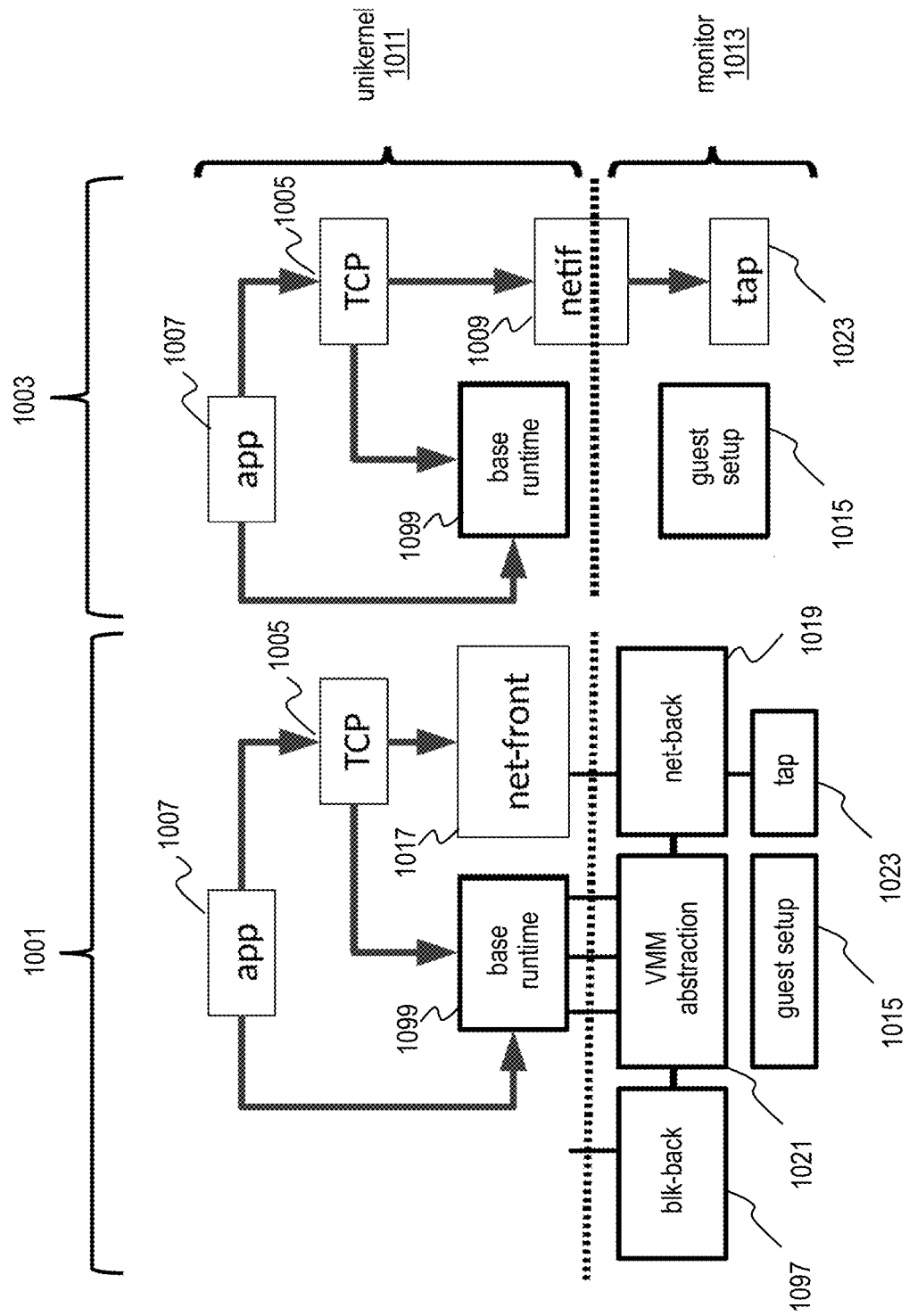
FIG. 10 depicts how application dependencies determine software that is assembled into a standard unikernel or a unikernel and monitor bundle, in accordance with an aspect of the invention.

For example, MirageOS, which produces OCaml-based unikernels, leverages the OCaml package manager, OPAM, to track dependencies between components of their library OS. FIG. 10 illustrates that application dependencies determine software that is assembled into a standard unikernel (at 1001) or a unikernel and monitor bundle (as at 1003). As depicted at 1001 in FIG. 10, even modules that would typically be included by default in a monolithic OS, such as the TCP stack 1005, are packages with tracked dependencies. In this example, the application 1007 requires TCP, so at compile time, the toolchain selects both TCP and a network interface driver 1017 to interface with the virtual NIC 1019 exposed by the VMM (i.e. elements under the dotted line). Since the application does not use a file system, the toolchain excludes file system modules and block device driver modules from the build. It is important to note that the back-end virtual devices and their interfaces may still be present in the overall system regardless of whether the application needs them. In FIG. 10, boxes 1099, 1097, 1021, 1019, 1015, 1023 (left-hand occurrence) are included by default, whereas remaining boxes (including the right-hand occurrence of 1023) are selected based on application dependencies. For the avoidance of doubt, in FIG. 10, elements under the dotted line are in the monitor (VMM or unikernel monitor). Thus, the virtual NIC 1019 is exposed by the VMM (elements under the dotted line). Element 1021 is the part of the VMM that exposes a hardware abstraction for everything except I/O devices.

One or more embodiments extend the dependency-tracking notion through the monitor interface, more specifically by modifying the toolchain and the package manager. FIG. 10 at 1003 shows the same application 1007 that depends on TCP 1005. At build time, the modified toolchain selects TCP and a network interface driver 1009. Unlike the standard unikernel in location 1001 in FIG. 10, the network interface 1009 spans the unikernel 1011 and monitor 1013; it is not written assuming a generic virtual network device implementation such as virtio. Furthermore, the network interface module carries an explicit dependency on the backend network implementation via a TAP device 1023. In this case, the toolchain not only excludes file system modules and device driver modules from the unikernel, but from the monitor as well. If the application did not have a dependency chain to the network tap device, the toolchain would have excluded the tap driver, the interface, and the TCP module from the unikernel and monitor. The only default component in the monitor, guest setup 1015, is the component that is responsible for booting the unikernel 1011 (and destroying it on any unhandled exit). Still referring to FIG. 10, there is some code that is needed to provide a runtime abstraction for the application and libraries above. That is called the "base runtime" 1099. In standard hypervisors, device I/O is often provided via a generic split-driver model (front and back). The VM provides the front half of the driver and the VMM provides the back half. In location 1001, the VMM is not specialized, so it always contains the code to supply a back half (net-back 1019, blk-back 1097). The app 1007 in location 1001 doesn't need the block device though, so it hasn't included the front half of the driver (blk-front). The point is that the VMM will still expose that interface, even though the app doesn't have a frontend driver for it, much like the floppy drive emulation in QEMU (attacked with VENOM).

To realize such a system, one or more embodiments address pertinent issues regarding how to specify or encode packages, especially those that span the interface; what granularity packages should be; and how to automatically build an entire unikernel monitor from such packages.

Securing the Monitors: Unlike traditional virtual machine monitors in the cloud, there is not a single unikernel monitor for the cloud. From a cloud operation perspective, this implies that the cloud must evolve to support multiple monitors, a potentially different one for each unikernel.

While the need to support multiple monitors provides a challenge, we have found that monitors are small enough to be bundled with unikernels and safely run on the ubiquitous Linux KVM system. Implementation-wise, the unikernel monitor can be similar to a type-2 hypervisor: essentially a userspace program that leverages the host for most resource management. For example, a unikernel monitor that occupies the same place in the stack as QEMU in a standard Linux KVM/QEMU system can run on any Linux host with the KVM module. As described below, we have developed an experimental prototype that is similar to a type-2 hypervisor in this respect.

It should be noted that, in this circumstance, the monitor will execute in the isolation context of a normal user process, which may not be secure enough for multitenant clouds. Given the fact that the interface between the monitor and the unikernel is customized, the less-than-ideally-isolated monitor appears to be a straightforward channel for a unikernel to bypass its hardware-based isolation. We believe that well-defined interfaces and a modular, minimal approach to monitor construction will help assuage these fears. Unikernels are already noted to be small, but the overall size of the monitor is but a fraction of the size of the unikernel, making them amenable to formal verification or audit. For example, our experimental prototype monitor is just over 1000 lines of code, with a binary just 0.02% of a MirageOS-based static Web server unikernel binary. A cloud provider could mandate that each monitor be built from a set of certified modules.

A Prototype: ukvm

In order to show the feasibility of this new unit of execution on the cloud, a prototype experimental implementation of a unikernel monitor called ukvm will now be described. The ukvm unikernel monitor boots and acts as a monitor for a unikernel based on Solo5, a thin open source unikernel base, written in C, that (among other things) supports the MirageOS runtime and components. A Mirage application binary (compiled from OCaml code) is statically linked to the Solo5 kernel.

The ukvm unikernel monitor is a specialized monitor for a Solo5-based unikernel. Architecturally, the ukvm unikernel monitor is a replacement for QEMU (specifically the user level side of a KVM/QEMU system). It is a user level program that loads a kernel ELF executable (solo5+mirage), creates a KVM VCPU, and configures memory and registers so the Solo5 kernel can start in 64-bit privileged mode as a regular C main( ) The memory and register setup includes setting a linear page table (a unikernel has a single address space), a stack, and loading registers with some arguments for the kernel (such as the memory size).

The I/O interfaces between the ukvm unikernel monitor and Solo5 look like the one in FIG. 9. They provide zero-copy IO (input output) by allowing any address of memory to be used as a buffer (of any size), and making the call with no more than a single VM exit (no need to probe if the PCI bus is ready, as would be done with virtio). Basic disk and network back ends were implemented in the ukvm unikernel monitor by using TAP and host file reads and writes.

FIG. 11 shows the lines of code needed for implementing Solo5 on top of QEMU versus the ukvm unikernel monitor. Most of the reduction in Solo5 comes by removing virtio and the loader. Also, notice how an application configured not to use the network would have 10% less code in the ukvm unikernel monitor. For a concrete estimate of the size of the monitor in relation to the unikernel, the ukvm binary is 23 KB compared to the 11 MB Solo5 executable image when linked against the www Mirage application (only 0.2%).

One non-limiting exemplary experimental prototype implementation does not automatically select the minimal configuration needed to run; automatic selection is limited to the MirageOS components. Other embodiments could take a different approach.

Boot Time: We measured boot time for ukvm and compared it against traditional virtualization approaches like QEMU, and to the more recent lkvm (used by kvmtool in clear containers). QEMU exposes a physical machine abstraction and lkvm is a more lightweight monitor that skips the BIOS and bootloader phase and jumps directly to the 64-bit kernel. QEMU and lkvm were configured to use virtio network and block devices. The three monitors were configured to use 512 MB of memory, and one 2.90 GHz CPU core. Furthermore, the monitors were instrumented to trace the first VM instruction, the first serial output, the first network output, and the final halt instruction.

Figure 12:
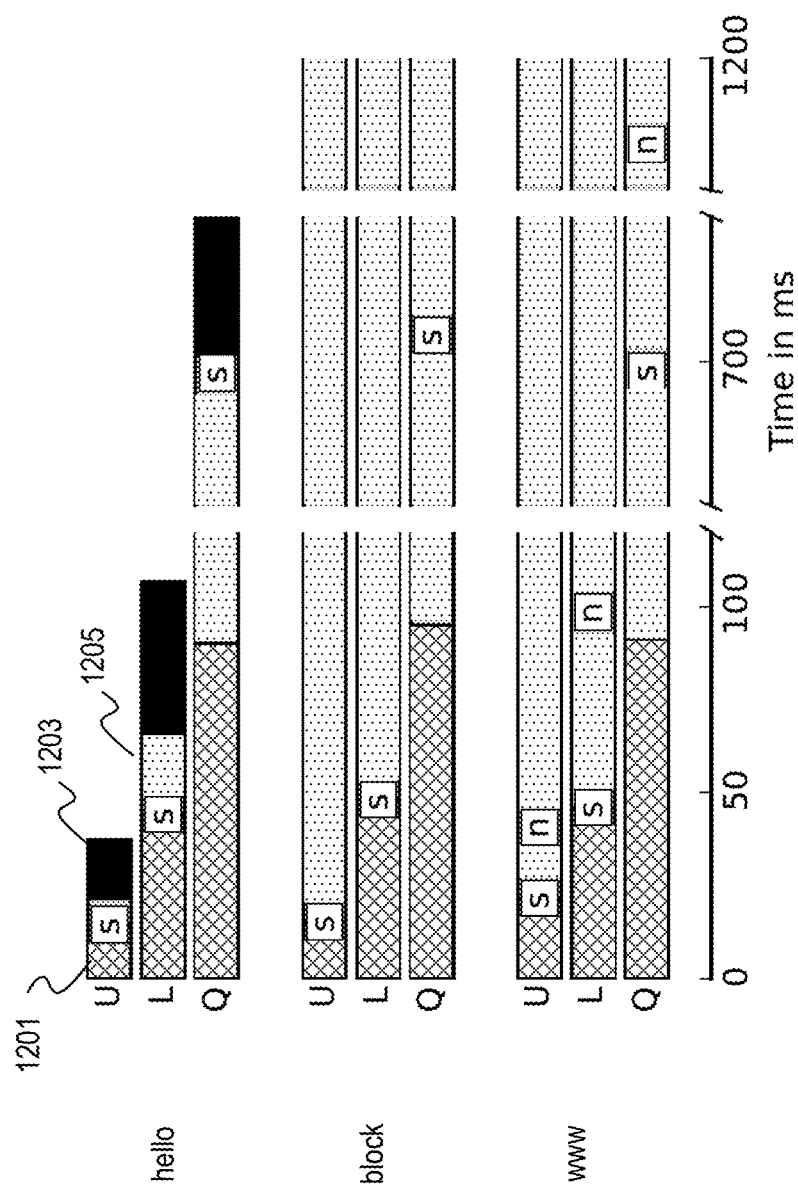
FIG. 12 shows non-limiting exemplary boot times for ukvm, lkvm, and QEMU for some applications, in accordance with an aspect of the invention.

FIG. 12 shows the boot times for QEMU (Q label), lkvm (L label), and ukvm (U label) for three MirageOS applications: hello (prints "hello" to the console then exits), block (tests disk reads and writes), and www (serves static Web pages). Notation "s" and "n" denote the first serial and network output, respectively.

The double-hatched bars on the left (e.g. 1201) show the time spent on monitor initialization. As expected, QEMU takes the longest, with 80 ms compared to lkvm that takes an average of 45 ms, and ukvm with 10 ms. Note that ukvm and lkvm load the 64-bit kernel immediately, so the kernel produces its first serial output (the "s") quicker than QEMU, which unpacks an ISO file in real mode to load the kernel. The www bars show that ukvm is able to do real work as soon as the kernel starts as the kernel sends its first network packet (the "n") 18 milliseconds after its first serial output. Note that lkvm and QEMU, on the other hand, first discover these devices, then initialize them before sending, resulting in at least 100 ms delay. The solid bars (e.g. 1203) are time to shut down (only the "hello" app has that in the timeframe shown), while the stippled bars (e.g. 1205) are time executing (excluding boot and shutdown).

One or more embodiments thus provide a new unit of execution for the cloud, built from the bundling of unikernels and specialized unikernel monitors. As a first step, with an exemplary experimental prototype monitor, ukvm, it has been demonstrated that such monitors can be small and simple, yet powerful enough to run real unikernels. We have found that the advantages of specializing cloud software stacks—including the monitor—are quite pertinent to realizing the security and responsiveness needs of future clouds.

Given the discussion thus far, it will be appreciated that an exemplary method, according to an aspect of the invention, includes obtaining, at a compiler toolchain 513, application code 511 for an application to be implemented (e.g., in a cloud environment). A further step includes accessing, with the compiler toolchain, a package manager 501 which tracks dependencies for a set of software components represented as a corresponding set of packages. The set of software components include application-level components represented as application-level packages 505; optionally, middleware-level components represented as middleware-level packages 507; optionally, operating system-level components represented as operating system-level packages 509; hypervisor interface-level components represented as hypervisor interface-level packages 521, and hypervisor-level components represented as hypervisor-level packages 523. The dependencies are specified as metadata of the set of packages. Regarding the optionality of middleware-level components and operating system-level components, consider, e.g., an in-memory database in the cloud or an app that does not need an OS on e.g. a small embedded device.

A still further step includes employing a dependency solver 599 of the package manager 501 to select a sub-set of the set of packages that satisfy corresponding ones of the dependencies based on references to given ones of the packages in the application 511 and corresponding metadata in each of the given ones of the packages. Yet a further step includes, with the compiler toolchain, assembling the set of packages into an executable bundle to implement the application. The executable bundle includes a statically-linked binary (e.g., a specialized virtual machine image such as unikernel 515) built entirely from the sub-set of the selected packages that contains no external dependencies except calls to an interface defined entirely by the hypervisor interface-level packages. The executable bundle further includes a specialized monitor (e.g., an executable type-2 micro-hypervisor 525) built entirely from the sub-set of the selected packages that runs on a standard operating system (e.g., Linux), loads and executes the statically-linked binary, and interacts with the statically-linked binary only through the interface defined by the hypervisor-interface-level packages.

As used herein, a standard operating system is defined in the context of a type-2 hypervisor architecture. In this regard, the hardware has extensions for virtualization which set up a processor context for the guest VM or virtual machine. Based on such hardware extensions/special processor context, there is software outside that is instructing the hardware to set up the special hardware context for the new application. Appropriate software instructs the hardware to set up a new processor context for the statically-linked binary. In the context of a type-2 hypervisor architecture, this is an application on top of an operating system such as Linux (particularly Linux with KVM) or MacOSx (particularly MacOSx with the hypervisor framework) or Windows, as opposed to a type-1 "bare metal" hypervisor. Since the resultant micro-hypervisor is itself specialized, it needs to run on the hardware so that it can run the unikernel. Thus, a "standard" operating system means an OS that already exists and is managing the hardware. The specialized monitor runs on top of this standard OS rather than directly on hardware. Non-limiting examples of standard OS that make type-2 easy include Linux+KVM and MacOSx+Hypervisor framework.

In some cases, in the employing step, the selected sub-set of the set of packages includes packages corresponding to only those of the set of software components needed to implement the application.

In some cases, further steps include distributing the executable bundle; creating, with the executable type-2 micro-hypervisor 525, an isolated context to run the unikernel 515; and running the unikernel in the isolated context created by the executable type-2 micro-hypervisor. Regarding distributing the executable bundle, in the existing cloud computing area there are servers running hypervisors and VM images that may come from third parties and the cloud infrastructure is assigning each VM to a server so it can run and execute. In that existing model, the hypervisor is the same for all servers. In one or more embodiments, in contrast, the type-2 hypervisor is specialized for each app; the specialized type-2 micro-hypervisor needs to be sent with it—the cloud infrastructure sends/assigns both items at same time as a bundle to a server to run. There is ultimately a hardware server under the virtualized server. A Docker container is an exemplary mechanism to distribute the bundle—upon distribution, the micro-hypervisor starts up the unikernel, for example.

In some embodiments, a further step includes taking action with the executable type-2 micro-hypervisor whenever the unikernel exits the isolated context. For example, the unikernel runs in an isolated processor context and the only way out is through one of these interfaces defined by the packages—the way control transfers from the isolated processor context back to the host context or type-2 hypervisor context is via an "exit"—an exit, colloquially, is for anything the system needs to do for you; e.g., I/O to devices. The logging and debugging interfaces provide value add (higher levels of abstraction than normal VM I/O operations). Destroying the unikernel is the default if the context is executed for a reason not in the list. The hypervisor interface level packages declare exactly what reasons the application is allowed to exit the processor context for and if it exits the context for any other reasons, such as an illegal instruction, or trying to make a call to a device which is not permitted, or the like, the unikernel is destroyed. The micro-hypervisor is a monitor for the unikernel in the processor context because it will always take over control whenever the processor context is exited.

In another aspect, an exemplary system includes a compiler toolchain 513 which obtains application code 511 for an application to be implemented, and a software component library storing a set of software components represented as a set of packages. The set of software components include application-level components represented as application-level packages 505; optionally, middleware-level components represented as middleware-level packages 507; optionally, operating system-level components represented as operating system-level packages 509; hypervisor interface-level components represented as hypervisor interface-level packages 521, and hypervisor-level components represented as hypervisor-level packages 523. The dependencies are specified as metadata of the set of packages.

The system further includes a package manager 501 in communication with the compiler toolchain and the software component library. The package manager in turn includes a dependency solver 599. The package manager tracks dependencies for the set of software components represented as the set of packages, and the package manager is accessed by the compiler toolchain. The dependency solver of the package manager selects a sub-set of the set of packages that satisfy corresponding ones of the dependencies based on references to given ones of the packages in the application and corresponding metadata in each of the given ones of the packages. The compiler toolchain assembles the sub-set of packages into an executable bundle to implement the application. The executable bundle includes a statically-linked binary and a specialized monitor as discussed above.

Preferably, the selected sub-set of the set of packages includes packages corresponding to only those of the set of software components needed to implement the application.

In some cases the system further includes the executable type-2 micro-hypervisor 525 and the unikernel 515. The executable type-2 micro-hypervisor creates an isolated context to run the unikernel, and the unikernel runs in the isolated context created by the executable type-2 micro-hypervisor. The executable type-2 micro-hypervisor takes action whenever the unikernel exits the isolated context.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-3 and accompanying text. In particular, the application 1007 is a "workload" 66. Some of the interfaces (e.g., for simplified monitoring or introspection) are related to (and interface with) the management layer 64, as seen at 99. Furthermore in this regard, the unikernel monitor allows the interface between the host and the unikernel to be specialized; thus, a subset of those interfaces may look very similar to normal VM hypervisor interfaces while a different subset may be used for "value added" aspects such as simplified monitoring (e.g. logging as discussed elsewhere herein, introspection in the debugging domain, and the like). Depending on the unikernel and the desires of the provider who is running the unikernel, the interfaces may differ between different applications. Current techniques, in contrast, typically employ a VM interface that is static for all. Note that the micro-hypervisor 525 is in layer 62.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks shown in FIG. 5.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining, at a compiler toolchain, application code for an application to be implemented;
   accessing, with said compiler toolchain, a package manager which tracks dependencies for a set of software components represented as a corresponding set of packages, said set of software components comprising application-level components represented as application-level packages, hypervisor interface-level components represented as hypervisor interface-level packages, and hypervisor-level components represented as hypervisor-level packages, said dependencies being specified as metadata of said set of packages;
   employing a dependency solver of said package manager to select a sub-set of said set of packages that satisfy corresponding ones of said dependencies based on references to given ones of said packages in said application and corresponding metadata in each of said given ones of said packages; and
   with said compiler toolchain, assembling said sub-set of packages into an executable bundle to implement said application, said executable bundle comprising:
      a statically-linked binary built entirely from said sub-set of said selected packages that contains no external dependencies except calls to an interface defined entirely by said hypervisor interface-level packages, and
      a specialized monitor built entirely from said sub-set of the selected packages that runs on a standard operating system, loads and executes said statically-linked binary, and interacts with said statically-linked binary only through said interface defined by said hypervisor interface-level packages.

2. The method of claim 1, wherein, in said assembling step:
   said statically-linked binary comprises a specialized virtual machine image; and
   said specialized monitor comprises an executable type-2 micro-hypervisor.

3. The method of claim 2, wherein, in said assembling step, said specialized virtual machine image comprises a unikernel.

4. The method of claim 3, further comprising:
   distributing said executable bundle;
   creating, with said executable type-2 micro-hypervisor, an isolated context to run said unikernel; and
   running said unikernel in said isolated context created by said executable type-2 micro-hypervisor.

5. The method of claim 4, further comprising taking action with said executable type-2 micro-hypervisor whenever said unikernel exits said isolated context.

6. The method of claim 3, wherein, in said employing step, said selected sub-set of said set of packages comprises packages corresponding to only those of said set of software components needed to implement said application.

7. The method of claim 1, wherein, in said assembling step, said standard operating system comprises Linux.

8. The method of claim 1, wherein, in said obtaining step, said application is to be implemented in a cloud environment.

9. The method of claim 1, wherein, in said accessing step, said set of software components further comprises middleware-level components represented as middleware-level packages and operating system-level components represented as operating system-level packages.

10. A system comprising:
    one or more processors configured to execute:
       a compiler toolchain which obtains application code for an application to be implemented;
       a software component library storing a set of software components represented as a corresponding set of packages, said set of software components comprising application-level components represented as application-level packages, hypervisor interface-level components represented as hypervisor interface-level packages, and hypervisor-level components represented as hypervisor-level packages, said dependencies being specified as metadata of said set of packages; and
       a package manager in communication with said compiler toolchain and said software component library, said package manager in turn comprising a dependency solver, said package manager tracking dependencies for said set of software components represented as said set of packages, said package manager being accessed by said compiler toolchain, said dependency solver of said package manager selecting a sub-set of said set of packages that satisfy corresponding ones of said dependencies based on references to given ones of said packages in said application and corresponding metadata in each of said given ones of said packages;
    wherein said compiler toolchain assembles said sub-set of packages into an executable bundle to implement said application, said executable bundle comprising:
       a statically-linked binary built entirely from said sub-set of said selected packages that contains no external dependencies except calls to an interface defined entirely by said hypervisor interface-level packages, and
       a specialized monitor built entirely from said sub-set of the selected packages that runs on a standard operating system, loads and executes said statically-linked binary, and interacts with said statically-linked binary only through said interface defined by said hypervisor interface-level packages.

11. The system of claim 10, wherein:
    said statically-linked binary comprises a specialized virtual machine image; and
    said specialized monitor comprises an executable type-2 micro-hypervisor.

12. The system of claim 11, wherein said specialized virtual machine image comprises a unikernel.

13. The system of claim 12, further comprising said executable type-2 micro-hypervisor and said unikernel, wherein:
    said executable type-2 micro-hypervisor creates an isolated context to run said unikernel; and
    said unikernel runs in said isolated context created by said executable type-2 micro-hypervisor.

14. The system of claim 13, wherein said executable type-2 micro-hypervisor takes action whenever said unikernel exits said isolated context.

15. The system of claim 12, wherein said selected sub-set of said set of packages comprises packages corresponding to only those of said set of software components needed to implement said application.

16. The system of claim 10, wherein said standard operating system comprises Linux.

17. The system of claim 10, wherein said application is implemented in a cloud environment.

18. The system of claim 10, wherein said set of software components further comprises middleware-level components represented as middleware-level packages and operating system-level components represented as operating system-level packages.

19. A non-transitory computer readable medium comprising computer executable instructions which when executed by a computer cause the computer to perform the method of:
   obtaining, at a compiler toolchain, application code for an application to be implemented;
   accessing, with said compiler toolchain, a package manager which tracks dependencies for a set of software components represented as a corresponding set of packages, said set of software components comprising application-level components represented as application-level packages, hypervisor interface-level components represented as hypervisor interface-level packages, and hypervisor-level components represented as hypervisor-level packages, said dependencies being specified as metadata of said set of packages;
   employing a dependency solver of said package manager to select a sub-set of said set of packages that satisfy corresponding ones of said dependencies based on references to given ones of said packages in said application and corresponding metadata in each of said given ones of said packages; and
   with said compiler toolchain, assembling said sub-set of packages into an executable bundle to implement said application, said executable bundle comprising:
      a statically-linked binary built entirely from said sub-set of said selected packages that contains no external dependencies except calls to an interface defined entirely by said hypervisor interface-level packages, and
      a specialized monitor built entirely from said sub-set of the selected packages that runs on a standard operating system, loads and executes said statically-linked binary, and interacts with said statically-linked binary only through said interface defined by said hypervisor interface-level packages.

20. The non-transitory computer readable medium of claim 19, wherein, in said method step of assembling:
   said statically-linked binary comprises a specialized virtual machine image; and
   said specialized monitor comprises an executable type-2 micro-hypervisor.

* * * * *